United States Patent [19]

Adam et al.

[11] Patent Number: 5,792,222
[45] Date of Patent: Aug. 11, 1998

[54] PROCESS FOR DYEING NATURAL OR SYNTHETIC POLYAMIDE FIBRE MATERIALS

[75] Inventors: Jean-Marie Adam, Rosenau; Jean-Pierre Bacher, Buschwiller; Francine Casi, Eschentzwiller, all of France

[73] Assignee: Ciba Specialty Chemicals Corporation, Tarrytown, N.Y.

[21] Appl. No.: 810,714

[22] Filed: Mar. 3, 1997

[30] Foreign Application Priority Data

Mar. 4, 1996 [CH] Switzerland ............... 562/96

[51] Int. Cl.$^6$ ............... D06P 3/24; D06P 1/642
[52] U.S. Cl. ............... 8/493; 8/566; 8/115.59; 8/924; 8/917; 534/803; 534/776; 544/208; 544/209; 544/189
[58] Field of Search ............... 544/208, 209; 8/493, 566, 115.59, 917, 924

[56] References Cited

U.S. PATENT DOCUMENTS

| | | | |
|---|---|---|---|
| 3,278,253 | 10/1966 | Weckler et al. | 8/493 |
| 3,400,121 | 9/1968 | Weckler et al. | 544/208 |
| 3,775,045 | 11/1973 | Buehler et al. | 8/448 |
| 4,563,189 | 1/1986 | Lewis | 8/493 |
| 4,950,301 | 8/1990 | Lewis | 8/127.5 |
| 5,314,504 | 5/1994 | Holfeld et al. | 8/115.56 |
| 5,637,679 | 6/1997 | Hassenrück et al. | 534/691 |

FOREIGN PATENT DOCUMENTS

| | | |
|---|---|---|
| 0098430 | 1/1984 | European Pat. Off. . |
| 0118983 | 9/1984 | European Pat. Off. . |
| 0175225 | 9/1985 | European Pat. Off. . |
| 0174794 | 3/1986 | European Pat. Off. . |
| 0190586 | 8/1986 | European Pat. Off. . |
| 0290384 | 11/1988 | European Pat. Off. . |
| 0692523 | 1/1996 | European Pat. Off. . |
| 0693483 | 1/1996 | European Pat. Off. . |

OTHER PUBLICATIONS

Chem. Abst. 100:105104y (1984).
Chem. Abst. 106:68727e (1987).
Chemical Abstracts, 106:215492 (1987).
JSDC, vol. 107, Oct. 1991, pp. 357–362.
Derwent Abst. 1995: 678701.
Dyes & Pigments, vol. 28, No. 3, pp. 171–192, 1995.
Dyes & Pigments, vol. 28, No. 4, pp. 237–259, 1995.
Derwent Abstract, 86–083026[13], of EP175225 (Mar. 26, 1986).

*Primary Examiner*—Fiona T. Powers
*Attorney, Agent, or Firm*—David R. Crichton

[57] ABSTRACT

Process for dyeing natural or synthetic polyamide fiber materials, which comprises dyeing these fiber materials with at least one anionic acid dye of the formula

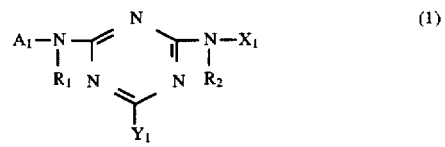

(1)

and treating the fiber material mentioned, during or after the dyeing process, with a colorless fixing agent which contains sulfo or sulfato groups and contains at least two fiber-reactive groups, where $R_1$ and $R_2$ independently of one another are hydrogen or substituted or unsubstituted $C_1$–$C_4$alkyl, $X_1$ is substituted or unsubstituted $C_1$–$C_8$alkyl, $C_5$–$C_7$cycloalkyl, phenyl or naphthyl, or the radical of the formula —$N(R_2)$—$X_1$ is a ring, which may contain further heteroatoms, $Y_1$ is a radical of the formula

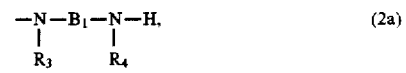

(2a)

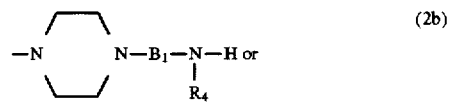

(2b)

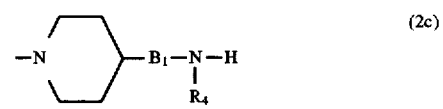

(2c)

in which $B_1$ is a colorless organic bridge member, $R_3$ is hydrogen or substituted or unsubstituted $C_1$–$C_4$alkyl and $R_4$ is hydrogen or substituted or unsubstituted $C_1$–$C_8$alkyl, $C_5$–$C_7$cycloalkyl, phenyl or naphthyl, and $A_1$ is as defined in claim 1.

16 Claims, No Drawings

PROCESS FOR DYEING NATURAL OR SYNTHETIC POLYAMIDE FIBRE MATERIALS

The present invention relates to a process for dyeing natural or synthetic polyamide fibre materials using fixing agents, and to novel fixing agents.

The practice of dyeing has recently led to increased requirements regarding the quality of the dyeings and the profitability of the dyeing process. There is consequently still a need for novel dyeing processes which have improved properties, in particular in respect of application and the fastness properties of the dyeings obtained.

Processes according to which the dyeings obtained have good fastness properties, in particular wet fastness properties, coupled with a high degree of exhaustion and a good dyeing yield, are now required for dyeing. These requirements are not met in all their properties by the known processes.

The present invention is therefore based on the object of discovering novel, improved processes for dyeing fibre materials which have, to a high degree, the qualities characterized above.

It has been found that the object described is largely achieved by the process defined below.

The present invention therefore relates to a process for dyeing natural or synthetic polyamide fibre materials, which comprises dyeing these fibre materials with at least one anionic acid dye of the formula $$A_1-N \underset{R_1}{\overset{}{\underset{|}{N}}}\!\!\diagup\!\!\!\overset{N}{\underset{N}{\diagdown}}\!\!\!\diagup\!\!\!\overset{}{\underset{Y_1}{\diagdown}}\!\!\!\diagup\!\!\!\overset{}{\underset{R_2}{\underset{|}{N}}}-X_1 \qquad (1)$$

and treating the fibre material mentioned, during or after the dyeing process, with a colourless fixing agent which contains sulfo or sulfato groups and contains at least two fibre-reactive groups, where $R_1$ and $R_2$ independently of one another are hydrogen or substituted or unsubstituted $C_1$–$C_4$alkyl, $X_1$ is substituted or unsubstituted $C_1$–$C_8$alkyl, $C_5$–$C_7$cycloalkyl, phenyl or naphthyl, or the radical of the formula —$N(R_2)$—$X_1$ is a ring, which may contain further hetero atoms, $Y_1$ is a radical of the formula $$-\underset{R_3}{\overset{}{\underset{|}{N}}}-B_1-\underset{R_4}{\overset{}{\underset{|}{N}}}-H, \qquad (2a)$$

$$-N\diagdown\!\!\!\diagup\!\!\!\!N-B_1-\underset{R_4}{\overset{}{\underset{|}{N}}}-H \quad \text{or} \qquad (2b)$$

$$-N\diagdown\!\!\!\diagup-B_1-\underset{R_4}{\overset{}{\underset{|}{N}}}-H \qquad (2c)$$

in which $B_1$ is a colourless organic bridge member, $R_3$ is hydrogen or substituted or unsubstituted $C_1$–$C_4$alkyl and $R_4$ is hydrogen or substituted or unsubstituted $C_1$–$C_8$alkyl, $C_5$–$C_7$cycloalkyl, phenyl or naphthyl, and $A_1$ is the radical of a monoazo dye of the formula $$K_1-N=N\!\!-\!\!\!\overset{}{\underset{(R_5)_{0-3}}{\diagdown\diagup\diagdown\diagup}}\!\!\!\qquad (3)$$

in which $K_1$ is a radical of the benzene or naphthalene series or a heterocyclic radical and $(R_5)_{0-3}$ is 0 to 3 identical or different substituents chosen from the group consisting of C–$C_4$alkyl, $C_1$–$C_4$alkoxy, $C_2$–$C_4$alkanoylamino, ureido, halogen, carboxyl and sulfo, or $A_1$ is the radical of a polyazo, metal complex azo, anthraquinone, formazan, phthalocyanine or dioxazine dye.

$C_1$–$C_4$alkyl $R_2$, $R_2$ and $R_3$ independently of one another are, for example methyl, ethyl, propyl, isopropyl, butyl, sec-butyl, tert-butyl or isobutyl. The alkyl radicals mentioned can be unsubstituted or substituted, for example by hydroxyl, sulfo, sulfato, cyano or carboxyl. Preferred alkyl radicals are the corresponding unsubstituted radicals.

$C_1$–$C_4$alkyl $R_5$ is, for example, methyl, ethyl, propyl, isopropyl, butyl, sec-butyl, tert-butyl or isobutyl.

$C_1$–$C_8$alkyl $R_4$ and $X_1$ independently of one another are preferably $C_1$–$C_4$alkyl radicals, for example methyl, ethyl, propyl, isopropyl, butyl, sec-butyl, tert-butyl or isobutyl. The alkyl radicals mentioned can be unsubstituted or substituted, for example by hydroxyl, sulfo, sulfato, cyano or carboxyl. The unsubstituted radicals are preferred here.

$C_1$–$C_4$alkoxy $R_5$ is, for example, methoxy, ethoxy, propoxy, isopropoxy, butoxy or isobutoxy, in particular methoxy.

$C_2$–$C_4$alkanoylamino $R_5$ is, in particular, acetylamino or propionylamino, preferably acetylamino.

Halogen $R_5$ is, for example, fluorine, chlorine or bromine, in particular chlorine.

A ring which may contain further hetero atoms for the radical of the formula —$N(R_2)$—$X_1$ is, for example, morpholino.

$C_5$–$C_7$cycloalkyl $X_1$ and $R_4$ is, in particular, the cyclohexyl radical. The cycloalkyl radicals mentioned can be unsubstituted or substituted, for example by $C_1$–$C_4$alkyl, in particular by methyl.

Phenyl or naphthyl $X_1$ and $R_4$ are, in addition to the corresponding unsubstituted radicals, the radicals substituted, for example, by $C_1$–$C_4$alkyl, $C_1$–$C_4$alkoxy, $C_2$–$C_4$alkanoylamino, amino, hydroxyl, ureido, halogen, carboxyl or sulfo.

A colourless organic bridge member $B_1$ is, for example, substituted or unsubstituted $C_1$–$C_{12}$alkylene, which can be interrupted by 1, 2 or 3 members from the group consisting of —NH—, —N(CH$_3$)— or —O—, or substituted or unsubstituted $C_5$–$C_7$cycloalkylene, phenylene or naphthylene. $C_5$–$C_7$cycloalkylene here is, in particular, cyclohexylene, which can be unsubstituted or substituted, for example by $C_1$–$C_4$alkyl, in particular by methyl. Substituents here of the phenylene and napthylene radicals mentioned are, for example, $C_1$–$C_4$alkyl, $C_1$–$C_4$alkoxy, $C_2$–$C_4$alkanoylamino, amino, hydroxyl, ureido, halogen, carboxyl or sulfo, in particular $C_1$–$C_4$alkyl, $C_1$–$C_4$alkoxy, halogen or sulfo. Substituents of the $C_1$–$C_{12}$alkylene radicals mentioned are, for example hydroxyl, sulfo, sulfato, cyano or carboxyl. The $C_1$–$C_{12}$-alkylene radicals are preferably unsubstituted.

$R_1$ and $R_2$ are preferably independently of one another hydrogen or $C_1$–$C_4$alkyl. $R_1$ is particularly preferably hydrogen, methyl or ethyl, in particular hydrogen. $R_2$ is particularly preferably $C_1$–$C_4$alkyl, in particular methyl or ethyl, and preferably ethyl.

$(R_5)_{0-3}$ is preferably 0 to 3 identical or different substituents chosen from the group consisting of $C_1$–$C_4$alkyl, $C_1$–$C_4$alkoxy, halogen and sulfo. The radicals of the formula (3) preferably contain only one substituent $R_5$, which is hydrogen or sulfo, in particular sulfo.

$X_1$ is preferably $C_1$–$C_8$alkyl, $C_5$–$C_7$-cycloalkyl which is unsubstituted or substituted by $C_1$–$C_4$alkyl, or phenyl or naphthyl which are unsubstituted or substituted by $C_1$–$C_4$alkyl, $C_1$–$C_4$alkoxy, $C_2$–$C_4$alkanoylamino, ureido, halogen, carboxyl or sulfo. The phenyl radical, which can be substituted as defined above, is particularly preferred here. $X_1$ is especially preferably phenyl which is unsubstituted or substituted by $C_1$–$C_4$alkyl, $C_1$–$C_4$alkoxy, halogen or sulfo, preferably unsubstituted phenyl. $R_2$ here is particularly preferably $C_1$–$C_4$alkyl, in particular methyl or ethyl and preferably ethyl.

$B_1$ is preferably a $C_1$–$C_{12}$alkylene radical, in particular a $C_1$–$C_{10}$alkylene radical, which can be interrupted by 1, 2 or 3 members from the group consisting of —NH—, —N(CH$_3$)— or, in particular, —O—, and is unsubstituted or substituted by hydroxyl, sulfo, sulfato, cyano or carboxyl. The corresponding unsubstituted alkylene radicals are of particular interest here.

$B_1$ is particularly preferably a $C_1$–$C_{10}$alkylene radical, in particular a $C_1$–C6alkylene radical, and preferably a $C_1$–$C_4$alkylene radical. Particularly interesting radicals $B_1$ are those of the formulae —CH$_2$—, —CH$_2$CH$_2$— and —CH$_2$CH$_2$CH$_2$—.

$R_3$ is preferably hydrogen or $C_1$–$C_4$alkyl, in particular hydrogen.

$R_4$ is preferably hydrogen or $C_1$–$C_8$alkyl which is unsubstituted or substituted by hydroxyl, sulfo, sulfato, cyano or carboxyl, preferably hydrogen or $C_1$–$C_4$alkyl, and in particular hydrogen.

Preferably, $R_3$ and $R_4$ independently of one another are hydrogen or $C_1$–$C_4$alkyl and $B_1$ is a $C_1$–$C_{10}$alkylene radical.

The radical $Y_1$ is preferably a radical of the formula (2a) or (2b), in particular a radical of the formula (2a).

The radical of the formula (3) is preferably a radical of the formula

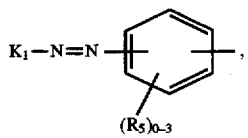

(4)

in which $K_1$ and $(R_5)_{0-3}$ are as defined and preferred above.

The radical $K_1$ is preferably a benzene, naphthalene, 6-hydroxypyrid-2-one, 1-phenyl-5-aminopyrazole, 1-phenylpyrazol-5-one or indole radical, in particular a benzene, naphthalene, 1-phenyl-5-aminopyrazole or 1-phenylpyrazol-5-one radical, and preferably a naphthalene, 1-phenyl-5-aminopyrazole or 1-phenylpyrazol-5-one radical.

Examples of substituents of the radical $K_1$ are the following:

$C_1$–$C_8$alkyl, in particular $C_1$–$C_4$alkyl, such as methyl, ethyl, propyl, isopropyl, butyl, isobutyl, sec-butyl or tert-butyl; $C_1$–$C_8$alkoxy, in particular $C_1$–$C_4$alkoxy, such as methoxy, ethoxy, propoxy, isopropoxy, butoxy, isobutoxy, sec-butoxy or tert-butoxy; $C_2$–$C_6$-alkanoylamino, in particular $C_2$–$C_4$-alkanoylamino, for example propionylamino or, in particular, acetylamino; halogen, for example fluorine or, in particular, chlorine; hydroxyl; cyano; carbamoyl; carboxyl; sulfo; phenyl; amino and N-mono- or N,N-di-$C_1$–$C_4$alkylamino. In this case, the phenyl radicals mentioned can be unsubstituted or substituted, for example by $C_1$–$C_4$alkyl, $C_1$–$C_4$alkoxy, $C_2$–$C_4$-alkanoylamino, ureido, halogen, carboxyl or sulfo.

Particularly preferably, $K_1$ is a radical of the formula

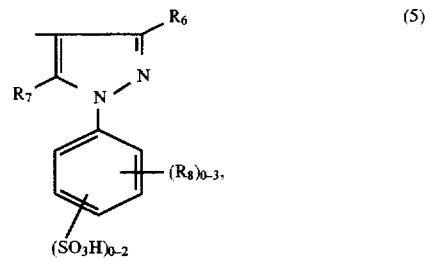

(5)

in which $R_6$ is methyl or carboxyl, $R_7$ is amino or hydroxyl and $(R_8)_{0-3}$ is 0 to 3 identical or different substituents chosen from the group consisting of $C_1$–$C_4$alkyl, $C_1$–$C_4$alkoxy, $C_2$–$C_4$alkanoylamino, ureido, halogen, carboxyl and sulfo, or $K_1$ is a radical of the formula

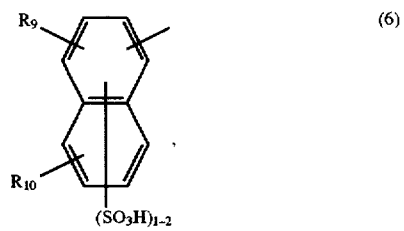

(6)

in which $R_9$ is hydrogen, amino or N-mono- or N,N-di-$C_1$–$C_4$alkylamino and $R_{10}$ is hydrogen or hydroxyl.

$R_6$ is preferably methyl.

$(R_8)_{0-3}$ is preferably 0 to 3 identical or different substituents chosen from the group consisting of $C_1$–$C_4$alkyl, $C_1$–$C_4$alkoxy, halogen and sulfo.

$R_9$ is preferably amino or N-mono- or N,N-di-$C_1$–$C_4$alkylamino, in particular amino.

$R_1$ is preferably hydrogen.

The radicals of the formula (6) preferably contain only one sulfo group.

Preferred radicals $K_1$ of the formula (6) are those of the formula

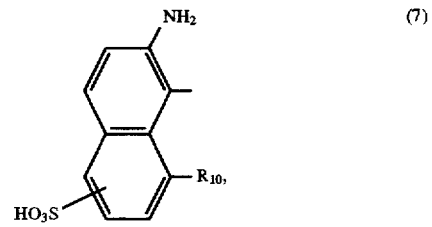

(7)

in which $R_{10}$ is hydrogen or hydroxyl, in particular hydrogen.

The radical $A_1$ in the dye of the formula (1), as a radical of a polyazo, metal complex azo, anthraquinone, formazan, phthalocyanine or dioxazine dye, can contain the substituents customary in organic dyes bonded to its basic structure.

Examples of substituents in the radical $A_1$ are: alkyl groups having 1 to 4 carbon atoms, such as methyl, ethyl, propyl, isopropyl or butyl, it being possible for the alkyl radicals to be further substituted, for example by hydroxyl, sulfo or sulfato; alkoxy groups having 1 to 4 carbon atoms, such as methoxy, ethoxy, propoxy, isopropoxy or butoxy, it being possible for the alkyl radicals to be further substituted, for example by hydroxyl, sulfo or sulfato; phenyl which is unsubstituted or substituted by $C_1$-$C_4$alkyl, $C_1$-$C_4$alkoxy, halogen, carboxyl or sulfo; acylamino groups having 1 to 8 carbon atoms, in particular such alkanoylamino groups, for example acetylamino or propionylamino; benzoylamino which is unsubstituted or substituted in the phenyl ring by $C_1$-$C_4$alkyl, $C_1$-$C_4$alkoxy, halogen or sulfo; phenylamino which is unsubstituted or substituted in the phenyl ring by $C_1$-$C_4$alkyl, $C_1$-$C_4$alkoxy, halogen or sulfo; N,N-di-β-hydroxyethylamino; N,N-di-β-sulfatoethylamino; alkylsulfonyl having 1 to 4 carbon atoms, such as methylsulfonyl or ethylsulfonyl; trifluoromethyl; nitro; amino; cyano; halogen, such as fluorine, chlorine or bromine; carbamoyl; sulfamoyl; N-mono- or N,N-dialkylsulfamoyl having in each case 1 to 4 carbon atoms; N-phenylsulfamoyl which is unsubstituted or substituted by $C_1$-$C_4$alkyl, $C_1$-$C_4$alkoxy, halogen, carboxyl or sulfo; ureido; hydroxyl; carboxyl; sulfomethyl or sulfo.

$A_1$ as a radical of a polyazo dye is, in particular, a radical of a disazo dye, preferably a radical of the formula $$[K_2-N=N-M-N=N-D+] \quad (8)$$

in which D is a radical of the benzene or naphthalene series,
M is the radical of a central component of the benzene or naphthalene series and $K_2$ is a radical of the benzene or naphthalene series or a heterocyclic radical.

The radical $K_2$ here is as defined and preferred above for $K_1$.

Examples of substituents of the radicals D and M are the following:

$C_1$-$C_8$alkyl, in particular $C_1$-$C_4$alkyl, such as methyl, ethyl, propyl, isopropyl, butyl, isobutyl, sec-butyl or tert-butyl; $C_1$-$C_8$alkoxy, in particular $C_1$-$C_4$alkoxy, such as methoxy, ethoxy, propoxy, isopropoxy, butoxy, isobutoxy, sec-butoxy or tert-butoxy; $C_2$-$C_6$alkanoylamino, in particular $C_2$-$C_4$alkanoylamino, for example propionylamino or, in particular, acetylamino; halogen, for example fluorine or, in particular, chlorine; hydroxyl; cyano; carbamoyl; carboxyl; sulfo; phenyl; amino and N-mono- or N,N-di-$C_1$-$C_4$alkylamino. In this case, the phenyl radicals mentioned can be unsubstituted or substituted, for example by $C_1$-$C_4$alkyl, $C_1$-$C_4$alkoxy, $C_2$-$C_4$alkanoylamino, ureido, halogen, carboxyl or sulfo.

Preferred substituents of the radicals D and M are $C_1$-$C_4$alkyl, $C_1$-$C_4$alkoxy, $C_2$-$C_4$alkanoylamino, halogen, hydroxyl, cyano, carbamoyl, carboxyl, sulfo, amino or N-mono- or N,N-di-$C_1$-$C_4$alkylamino. Particularly preferred substituents of the radicals D and M are $C_1$-$C_4$alkyl, $C_1$-$C_4$alkoxy, $C_2$-$C_4$alkanoylamino, halogen, hydroxyl, sulfo, amino or N-mono- or N,N-di-$C_1$-$C_4$alkylamino.

Particularly preferred radicals $A_1$ of a disazo dye are radicals of the formula

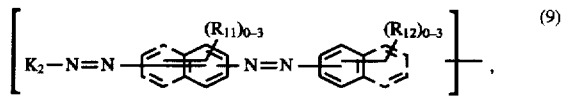

in which
$K_2$ is as defined and preferred above and $(R_{11})_{0-3}$ and $(R_{12})_{0-3}$ independently of one another are 0 to 3 identical or different substituents chosen from the group consisting of $C_1$-$C_4$alkyl, $C_1$-$C_4$alkoxy, $C_2$-$C_4$alkanoylamino, halogen, hydroxyl, cyano, carbamoyl, carboxyl, sulfo, amino and N-mono- or N,N-di-$C_1$-$C_4$alkylamino. $(R_{11})_{0-3}$ and $(R_{12})_{0-3}$ preferably independently of one another are 0 to 3 identical or different substituents chosen from the group consisting of $C_1$-$C_4$alkyl, $C_1$-$C_4$alkoxy, $C_2$-$C_4$alkanoylamino, halogen, hydroxyl, sulfo amino and N-mono or N,N-di-$C_1$-$C_4$alkylamino, $(R_{11})_{0-3}$ and $(R_{12})_{0-3}$ especially preferably independently of one another are 0 to 3 identical or different substituents chosen from the group consisting of $C_1$-$C_4$alkyl, $C_1$-$C_4$alkoxy, $C_2$-$C_4$alkanoylamino, halogen, hydroxyl, sulfo amino Especially preferred radicals $A_1$ of a disazo dye are radicals of the formula

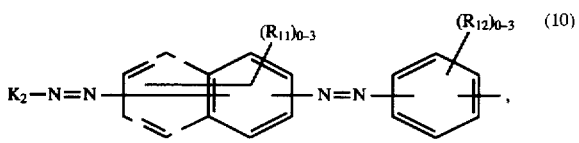

in which
$K_2$, $(R_{11})_{0-3}$ and $(R_{12})_{0-3}$ are as defined and preferred above.

$A_1$ as the radical of an anthraquinone dye is, in particular, a radical of the formula

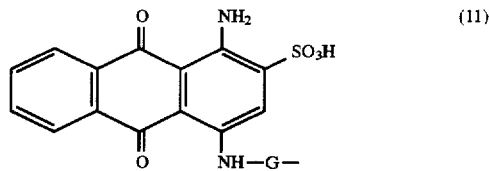

in which G is a phenylene radical which is unsubstituted or substituted by $C_1$-$C_4$alkyl, $C_1$-$C_4$alkoxy, halogen, carboxyl or sulfo, or a cyclohexylene, phenylenemethylene or $C_2$-$C_6$alkylene radical.

G is preferably a phenylene radical which is unsubstituted or substituted by $C_1$-$C_4$alkyl, $C_1$-$C_4$alkoxy, halogen, carboxyl or sulfo, in particular by $C_1$-$C_4$alkyl or sulfo.

Particularly important radicals $A_1$ of an anthraquinone dye are those of the formula

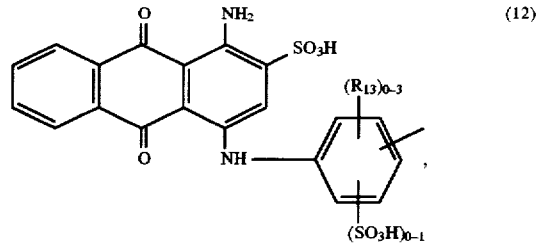

in which $(R_{13})_{0-3}$ is 0 to 3 identical or different substituents chosen from the group consisting of $C_1$-$C_4$alkyl, $C_1$-$C_4$alkoxy, halogen, carboxyl and sulfo. $R_{13}$ here is particularly preferably $C_1$-$C_4$alkyl, in particular methyl. The radical of the formula (12) preferably contains two sulfo groups.

The radical $A_1$ is preferably a radical of the formula (3) or the radical of a disazo or anthraquinone dye, these radicals mentioned being as defined and preferred above.

Preferred dyes of the formula (1) are those in which $A_1$ is a radical of the formula (3), (9) or (11). $K_1$ and $K_2$ here are preferably radicals of the formula (5) or (6), in particular radicals of the formula (5) or (7). The radicals $R_1$, $R_2$, $X_1$ and $Y_1$ here are as defined and preferred above.

Particularly preferred dyes of the formula (1) are those in which $A_1$ is a radical of the formula (4), (9) or (11). $K_1$ and $K_2$ here are preferably radicals of the formula (5) or (6), in particular radicals of the formula (5) or (7). The radicals $R_1$, $R_2$, $X_1$ and $Y_1$ here are as defined and preferred above.

Especially preferred dyes of the formula (1) are those in which $A_1$ is a radical of the formula (4), (10) or (12). $K_1$ and $K_2$ here are preferably radicals of the formula (5) or (6), in particular radicals of the formula (5) or (7). The radicals $R_1$, $R_2$, X1 and $Y_1$ here are as defined and preferred above.

The dyes of the formula (1) can be obtained, for example, by reacting cyanuric halide, in particular cyanuric fluoride or, preferably, cyanuric chloride, with a compound of the formula

$$A_1\text{—}NHR_1, \quad (13)$$

a compound of the formula

$$X_1\text{-}NHR_2 \quad (14)$$

and a compound of the formula

$$Y_1\text{-}H \quad (15)$$

in which $A_1$, $X_1$, $Y_1$, $R_1$ and $R_2$ are as defined under formula (1).

Preferably, the cyanuric halide is first reacted with approximately stoichiometric amounts of a compound of the formula (13) at a temperature of −5° to 20° C., preferably 0° to 5° C., the pH being kept neutral to acid, preferably at 2 to 7, in particular 2 to 4, by addition of suitable bases, for example alkali metal bases, such as lithium hydroxide or carbonate, sodium hydroxide or carbonate or potassium hydroxide or carbonate. Approximately stoichiometric amounts of a compound of the formula (14) are advantageously added to the resulting reaction mixture, and this compound is reacted with the triazine derivative at slightly elevated temperature, preferably at 10° to 60° C., in particular 15 to 30° C., and at a neutral to slightly acid pH, which is preferably 6 to 7.

Another possibility comprises first reacting the cyanuric halide with an intermediate of the compound of the formula (13), for example a diazo component in the case of azo dye radicals, and then reacting the product to give the corresponding dye radical $A_1$, for example by diazotization and coupling. This reaction to give the dye radical can be carried out, for example, preferably directly after the reaction of the cyanuric halide with the intermediate, or also during the subsequent course of the synthesis of the dye of the formula (1).

The triazinyl compounds obtainable by the processes described above still contain a halogen atom, which can be converted into a group $Y_1$ by reaction with a compound of the formula (15) at elevated temperature, preferably 20° to 70° C., and at a neutral to slightly alkaline pH, which is, for example, 7 to 9, depending on the compound of the formula (15) employed. An excess of the compound of the formula (15) is advantageously employed.

The compounds employed in the above processes are known or can be obtained analogously to known compounds.

The dyes of the formula (1) are present either in the form of their free acid or, preferably, as salts thereof.

Possible salts are, for example, the alkali metal, alkaline earth metal or ammonium salts or the salts of an organic amine. Examples are the sodium, lithium, potassium or ammonium salts or the salt of mono-, di- or triethanolamine.

The definitition sulfo includes generally the free acid form ($-SO_3H$) as well as the salt form.

The dyes of the formula (1) are anionic acid dyes. In the dyes of the formula (1), the number of anionic groups, in particular the number of sulfo groups, is greater than or equal to the number of cationic groups. Preferably, the number of anionic groups is greater than the number of cationic groups. Cationic groups are to be understood as meaning those which carry a cationic charge under customary dyeing conditions. Examples are aliphatically bonded amino radicals. The nitrogen atoms present in the triazine ring and those bonded to the triazine radical carry no cationic charge. The total number of sulfo and sulfato groups of the dyes of the formula (1) is preferably greater than one. The total number of sulfo and sulfato groups of the dyes of the formula (1) is preferably two to four, in particular two or three, and preferably two.

The colourless fixing agents used, which contain sulfo or sulfato groups and contain at least two fibre-reactive groups, are preferably those in which the total number of sulfo and sulfato groups is 1 to 4, in particular 2 to 4.

The total number of fibre-reactive groups is preferably 2 to 6, in particular 2 or 3. Particularly preferred fibre-reactive groups are those of the following formulae (18) and (20a) to (20f).

Preferred fixing agents are those of the formula

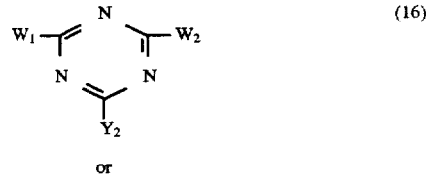

(16)

or

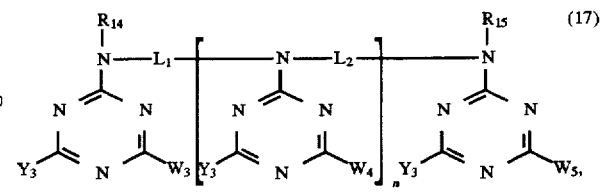

(17)

in which $R_{14}$ and $R_{15}$ independently of one another are hydrogen or substituted or unsubstituted $C_1$–$C_4$alkyl, $Y_2$ and $Y_3$ independently of one another are fluorine, chlorine, amino, N-mono- or N,N-di-$C_1$–$C_4$alkylamino which is unsubstituted or substituted in the alkyl moiety, $C_5$–$C_7$cycloalkylamino which is unsubstituted or substituted in the cycloalkyl ring, phenylamino or N-$C_1$–$C_4$alkyl-N-phenylamino which are unsubstituted or substituted in the phenyl ring, or N-heterocyclic radicals, which may contain further hetero atoms, $L_1$ and $L_2$ are a colourless, organic bridge member, n is the number 0 or 1, $W_1$, $W_2$, $W_3$, $W_4$ and $W_5$ independently of one another are a radical of the formula

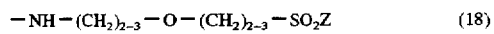

$$-NH-(CH_2)_{2-3}-O-(CH_2)_{2-3}-SO_2Z \quad (18)$$

or

-continued

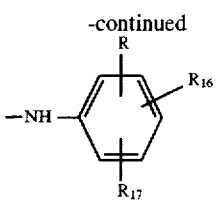

in which

R$_{16}$ and R$_{17}$ independently of one another are hydrogen, C$_1$–C$_4$alkyl, C$_1$–C$_4$alkoxy, C$_2$–C$_4$alkanoylamino, ureido, halogen, carboxyl or sulfo, Z is a radical of the formula —CH$_2$CH$_2$—U or —CH=CH$_2$ and U is a leaving group, and R is a radical of the formula

| | |
|---|---|
| —SO$_2$Z, | (20a) |
| —CONH—(CH$_2$)$_{2-3}$—SO$_2$Z, | (20b) |
| —NH—CO—CH(Hal)—CH$_2$—Hal, | (20c) |
| —NH—CO—C(Hal)=CH$_2$, | (20d) |
| —NH—CO—CH=CH$_2$ | (20e) |
| or | |
| —NH—CO—CH$_2$Cl | (20f) | and Hal is halogen and Z is as defined above.

C$_1$–C$_4$alkyl R$_{14}$ and R$_{15}$ independently of one another are, for example, methyl, ethyl, propyl, isopropyl, butyl, sec-butyl, tert-butyl or isobutyl. The alkyl radicals mentioned can be unsubstituted or substituted, for example by hydroxyl, sulfo, sulfato, cyano or carboxyl. Preferred alkyl radicals are the corresponding unsubstituted radicals.

R$_{14}$ and R$_{15}$ are preferably hydrogen or C$_1$–C$_4$alkyl, in particular hydrogen.

R$_{16}$ and R$_{17}$ are preferably hydrogen, C$_1$–C$_4$alkyl, C$_1$–C$_4$alkoxy, C$_2$–C$_4$-alkanoylamino, ureido, halogen or sulfo, in particular hydrogen, C$_1$–C$_4$alkyl, C$_1$–C$_4$alkoxy, halogen or sulfo, and preferably hydrogen, C$_1$–C$_4$alkyl, C$_1$–C$_4$alkoxy or sulfo. Particularly preferably, R$_{16}$ is hydrogen and R$_{17}$ is hydrogen or sulfo.

N-mono or N,N-di-C$_1$–C$_4$alkylamino Y$_2$ and Y$_3$ can be both the unsubstituted radicals and the radicals substituted in the alkyl moiety, for example by C$_1$–C$_4$alkyl, C$_1$–C$_4$alkoxy, hydroxyl, sulfo or sulfato. The radicals unsubstituted in the alkyl moiety are preferred.

C$_5$–C$_7$cycloalkylamino Y$_2$ and Y$_3$ can be both the unsubstituted radicals and the radicals substituted in the cycloalkyl ring, for example by C$_1$–C$_4$alkyl. The corresponding cyclohexyl radicals are preferred as such radicals.

Phenylamino or N-C$_1$–C$_4$alkyl-N-phenylamino Y$_2$ and Y$_3$ can be both the unsubstituted radicals and the radicals substituted in the phenyl ring, for example by C$_1$–C$_4$alkyl, C$_1$–C$_4$alkoxy, halogen, carboxyl or sulfo. These radicals are preferably unsubstituted in the phenyl ring.

N-heterocyclic radicals Y$_2$ and Y3 which may contain further hetero atoms are, for example, morpholino or piperidin-1-yl.

Y$_2$ and Y$_3$ are preferably chlorine or fluorine, in particular chlorine. n is preferably the number 0.

The leaving group U is, for example, —Cl, —Br, —F, —OSO$_3$H, —SSO$_3$H, —OCO—CH$_3$, —OPO$_3$H$_2$, —OCO—C$_6$H$_5$, —OSO$_2$C$_1$–C$_4$alkyl or —OSO$_2$—N (C$_1$–C$_4$alkyl)$_2$. U is preferably a group of the formula —Cl, —OSO$_3$H or —OCO—CH$_3$ and particularly preferably —Cl or —OSO$_3$H. U is especially preferably a group of the formula —OSO$_3$H.

The radical Z is preferably a radical of the formula —CH$_2$CH$_2$OSO$_3$H, —CH$_2$CH$_2$Cl or —CH=CH$_2$, in particular a radical of the formula —CH$_2$CH$_2$OSO$_3$H or —CH$_2$CH$_2$Cl.

A radical of the formula (18) is, in particular, a radical of the formula —NH—(CH$_2$)$_2$—O—(CH$_2$)$_2$—SO$_2$Z, in which Z is as defined and preferred above.

Hal is preferably bromine or chlorine, in particular bromine.

R is preferably a radical of the formula (20a), (20c) or (20d), in particular a radical of the formula (20a) or (20c), and preferably a radical of the formula (20a).

L$_1$ and L$_2$ are preferably colourless, aliphatic or aromatic bridge members.

Aliphatic bridge members L$_1$ and L$_2$ are, for example, C$_2$–C$_{12}$alkylene radicals, in particular C$_2$–C$_6$alkylene radicals, which can be interrupted by 1, 2 or 3 members from the group consisting of —NH—, —N(CH$_3$)— or, in particular, —O—, and are unsubstituted or substituted by hydroxyl, sulfo, sulfato, cyano or carboxyl. Preferred substituents of the alkylene radicals L$_1$ and L$_2$ are hydroxyl, sulfo or sulfato, in particular hydroxyl. The alkylene radicals mentioned are preferably unsubstituted. C$_2$–C$_4$alkylene radicals, in particular the radical of the formula —CH$_2$CH$_2$—, are of particular importance.

Aliphatic bridge members L$_1$ and L$_2$, for example, are furthermore C$_5$–C$_9$cycloalkylene radicals, such as, in particular, cyclohexylene radicals. The cycloalkylene radicals mentioned can be unsubstituted or substituted by C$_1$–C$_4$alkyl, C$_1$–C$_4$alkoxy, C$_2$–C$_4$alkanoylamino, sulfo, halogen or carboxyl, in particular by C$_1$–C$_4$alkyl. Aliphatic bridge members L$_1$ and L$_2$ are furthermore methylene-cyclohexylene or methylene-cyclohexylene-methylene radicals which are unsubstituted or substituted in the cyclohexylene ring by C$_1$–C$_4$alkyl.

Aromatic bridge members L$_1$ and L$_2$ are, for example, C$_1$–C$_6$alkylenephenylene or, in particular, phenylene which are unsubstituted or substituted by C$_1$–C$_4$alkyl, C$_1$–C$_4$alkoxy, C$_2$–C$_4$alkanoylamino, sulfo, halogen or carboxyl. Phenylene which is unsubstituted or substituted by C$_1$–C$_4$alkyl, C$_1$–C$_4$alkoxy, halogen or sulfo, in particular sulfo, is preferred here.

Aromatic bridge members L$_1$ and L$_2$ are furthermore, for example, radicals of the formula

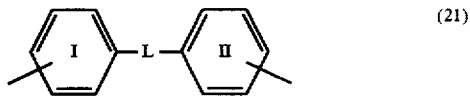
(21)

in which the benzene rings I and II are unsubstituted or substituted by C$_1$–C$_4$alkyl, C$_1$–C$_4$alkoxy, C$_2$–C$_4$alkanoylamino, sulfo, halogen or carboxyl and L is a direct bond or a C$_2$–C$_{10}$alkylene radical, which can be interrupted by 1, 2 or 3 oxygen atoms, in particular a C$_2$–C$_4$alkylene radical, or L is a bridge member of the formula —CH=CH—, —NH—, —CO—, —NH—CO—, —CO—NH—, —NH—CO—NH—, —NH—CO—CO—NH—,— O—, —S—or —SO2—, or L is a bridge member of the formula

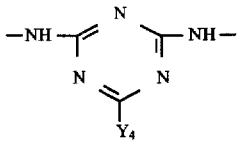
(22)

in which $Y_4$ is as defined and preferred above for $Y_2$.

The benzene rings I and II of the above formula (21) are preferably unsubsituted or mono- or disubstituted. Preferred substituents are $C_1$-$C_4$alkyl, $C_1$-$C_4$alkoxy, halogen or sulfo, in particular sulfo. The benzene rings I and II of the above formula (21) are particularly preferably unsubsituted or monosubstituted by sulfo.

L is preferably a direct bond or a bridge member of the formula —CH=CH—, —NH—, —CO—, —NH—CO—, —CO—NH—, —NH—CO—NH— or —NH—CO—CO—NH— or a bridge member of the formula (22), preferably a bridge member of the formula —CH=CH—, —NH—CO— or —CO—NH—, and in particular a bridge member of the formula —CH=CH— or —NH—CO—.

Preferred bridge members of the formula (21) are those in which the benzene rings I and II are unsubstituted or mono- or disubstituted by $C_1$-$C_4$alkyl, $C_1$-$C_4$alkoxy, halogen or sulfo, in particular sulfo, and L is a direct bond or a bridge member of the formula —CH=CH—, —NH—, —CO—, —NH—CO—, —CO—NH—, —NH—CO—NH— or —NH—CO—CO—NH— or a bridge member of the formula (22), preferably a bridge member of the formula —CH=CH—, —NH—CO— or —CO—NH—, and in particular a bridge member of the formula —CH=CH— or —NH—CO—.

Aromatic bridge members $L_1$ and $L_2$ are furthermore, for example, radicals of the formula

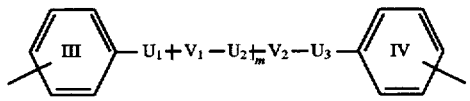
(23)

in which
  the benzene rings III and IV are unsubstituted or substituted by $C_1$-$C_4$alkyl, $C_1$-$C_4$alkoxy, $C_2$-$C_4$alkanoylamino, sulfo, halogen or carboxyl,
  m is a number from 0 to 5,
  $U_1$, $U_2$ and $U_3$ independently of one another are radicals of the formula —NH—CO—, —CO—NH—, —NH—CO—NH— or —NH—CO—CO—NH— or of the above formula (22) and
  $V_1$ and $V_2$ independently of one another are radicals of the formula

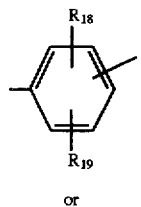
(24)

or

-continued
(25)

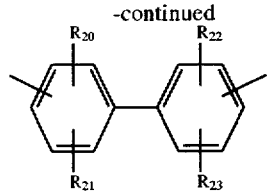

in which $R_{18}$, $R_{19}$, $R_{20}$, $R_{21}$, $R_{22}$ and $R_{23}$ independently of one another are hydrogen, $C_1$-$C_4$alkyl, $C_1$-$C_4$alkoxy, $C_2$-$C_4$alkanoylamino, sulfo, halogen or carboxyl.

$Y_4$ is preferably chlorine.

The benzene rings III and IV of the above formula (23) are preferably unsubstituted or mono- or disubstituted. Preferred subsituents are $C_1$-$C_4$alkyl, $C_1$-$C_4$alkoxy, halogen or sulfo, in particular sulfo. The benzene rings III and IV of the above formula (23) are particularly preferably unsubstituted or monosubstituted by sulfo.

$R_{18}$, $R_{19}$, $R_{20}$, $R_{21}$, $R_{22}$ and $R_{23}$ are preferably independently of one another hydrogen, $C_1$-$C_4$alkyl, $C_1$-$C_4$alkoxy, halogen or sulfo, in particular hydrogen or sulfo.

$U_1$, $U_2$ and $U_3$ are preferably independently of one another radicals of the formula —NH—CO—, —CO—NH— or —NH—CO—CO—NH— or of the above formula (22), in particular radicals of the formula —NH—CO—, —CO—NH— or —NH—CO—CO—NH—, and preferably radicals of the formula —NH—CO— or —CO—NH—.

Preferred radicals $U_1$, $U_2$ and $U_3$ of the above formula (22) are those in which $Y_4$ is chlorine. m is preferably the number 0, 1 or 2, in particular the number 0 or 1, and preferably the number 0.

$V_1$ and $V_2$ are preferably radicals of the formula (24).

Preferred bridge members of the formula (23) are those in which the benzene rings III and IV are unsubstituted or mono- or disubstituted by $C_1$-$C_4$alkyl, $C_1$-$C_4$alkoxy, halogen or sulfo, in particular sulfo, $R_{18}$, $R_{19}$, $R_{20}$, $R_{21}$, $R_{22}$ and $R_{23}$ independently of one another are hydrogen, $C_1$-$C_4$alkyl, $C_1$-$C_4$alkoxy, halogen or sulfo, in particular hydrogen or sulfo, $U_1$, $U_2$ and $U_3$ independently of one another are radicals of the formula —NH—CO—, —CO—NH— or —NH—CO—CO—NH— or of the above formula (22), in particular radicals of the formula —NH—CO—, —CO—NH— or —NH—CO—CO—NH—, and preferably radicals of the formula —NH—CO— or —CO—NH—, and m is the number 0 or 1, in particular the number 0.

The bridge members $L_1$ and $L_2$ are preferably
a) $C_2$-$C_{12}$alkylene radicals, in particular $C_2$-$C_6$alkylene radicals, which can be interrupted by 1, 2 or 3 members from the group consisting of —NH—, —N(CH$_3$)— or, in particular, —O—, or
b) cyclohexylene, methylene-cyclohexylene or methylene-cyclohexylene-methylene radicals which are unsubstituted or substituted in the cyclohexylene ring by $C_1$-$C_4$alkyl, or
c) $C_1$-$C_6$alkylenephenylene or, in particular, phenylene which are unsubstituted or substituted by $C_1$-$C_4$alkyl, $C_1$-$C_4$alkoxy, $C_2$-$C_4$alkanoylamino, sulfo, halogen or carboxyl, or
d) radicals of the formula (21), in which the benzene rings I and II are unsubstituted or mono- or disubstituted by $C_1$-$C_4$alkyl, $C_1$-$C_4$alkoxy, halogen or sulfo, in particular sulfo, and
L is a direct bond or
a bridge member of the formula —CH=CH—, —NH—, —CO—, —NH—CO—, —CO—NH—, —NH—CO—NH— or —NH—CO—CO—NH— or a bridge member of the formula (22), preferably a bridge member of the formula —CH=CH—, —NH—CO— or —CO—NH—, and in particular a bridge member of the formula —CH=CH—or —NH—CO—, or e) radicals of the formula (23) in which the benzene rings III and IV are unsubstituted or mono- or disubstituted by $C_1$–$C_4$alkyl, $C_1$–$C_4$alkoxy, halogen or sulfo, in particular sulfo, $R_{18}$, $R_{19}$, $R_{20}$, $R_{21}$, $R_{22}$ and $R_{23}$ independently of one another are hydrogen, $C_1$–$C_4$alkyl, $C_1$–$C_4$alkoxy, halogen or sulfo, in particular hydrogen or sulfo, $U_1$, $U_2$ and $U_3$ independently of one another are radicals of the formula —NH—CO—, —CO—NH— or —NH—CO—CO—NH— or of the above formula (22), in particular radicals of the formula —NH—CO—, —CO—NH— or —NH—CO—CO—NH—, and preferably radicals of the formula —NH—CO— or —CO—NH—, and m is the number 0 or 1, in particular the number 0.

The bridge members $L_1$ and $L_2$ are particularly preferably a) $C_2$–$C_6$alkylene radicals, or b) phenylene which is unsubstituted or substituted by $C_1$–$C_4$alkyl, $C_1$–$C_4$alkoxy, halogen or sulfo, in particular sulfo, or c) radicals of the formula (21), in which the benzene rings I and II are unsubstituted or mono- or disubstituted by $C_1$–$C_4$alkyl, $C_1$–$C_4$alkoxy, halogen or sulfo, in particular sulfo, and L is a direct bond or a bridge member of the formula —CH=CH—, —NH—, —CO—, —NH—CO—, —CO—NH—, —NH—CO—NH— or —NH—CO—CO—NH— or a bridge member of the formula (22), preferably a bridge member of the formula —CH=CH—, —NH—CO— or —CO—NH— and in particular a bridge member of the formula —CH=CH— or —NH—CO—, or d) radicals of the formula (23), in which the benzene rings III and IV are unsubstituted or mono- or disubstituted by $C_1$–$C_4$alkyl, $C_1$–$C_4$alkoxy, halogen or sulfo, in particular sulfo, $R_{18}$, $R_{19}$, $R_{20}$, $R_{21}$, $R_{22}$ and $R_{23}$ independently of one another are hydrogen, $C_1$–$C_4$alkyl, $C_1$–$C_4$alkoxy, halogen or sulfo, in particular hydrogen or sulfo, $U_1$, $U_2$ and $U_3$ independently of one another are radicals of the formula —NH—CO—, —CO—NH— or —NH—CO—CO—NH— or of the above formula (22), in particular radicals of the formula —NH—CO—, —CO—NH— or —NH—CO—CO—NH— and preferably radicals of the formula —NH—CO— or —CO—NH—, and m is the number 0 or 1, in particular the number 0.

Preferably, in the fixing agents of the formula (17)

$R_{14}$ and $R_{15}$ are identical, $L_1$ and $L_2$ are identical and $W_3$, $W_4$ and $W_5$ are identical.

Particularly preferred fixing agents are those of the formula (16) or (17) in which $R_{14}$ and $R_{15}$ are hydrogen or $C_1$–$C_4$alkyl, in particular hydrogen.

$Y_2$ and $Y_3$ are chlorine.

$L_1$ and $L_2$ are as defined and preferred above, n is the number 0 or 1, preferably the number 0, Z is a radical of the formula —$CH_2CH_2OSO_3H$, —$CH_2CH_2Cl$ or —$CH=CH_2$, R is a radical of the formula (20a), (20c) or (20d), in particular a radical of the formula (20a) or (20c), and Hal is bromine or chlorine, in particular bromine.

Fixing agents which are of particular interest are those of the formula (16) or those of the formula (17) in which n is the number 0. Fixing agents of the formula (16) are of special interest.

The present invention furthermore relates to the novel compounds of the formulae (16) and (17) in which $R_{14}$, $R_{15}$, $Y_2$, $Y_3$, $L_1$, $L_2$, $W_1$, $W_2$, $W_3$, $W_4$, $W_5$ and n are as defined under formulae (16) and (17), with the proviso that if the compounds of the formula (16) contain a radical $W_1$ and a radical $W_2$ of the formula (19) and $Y_2$ is chlorine or a phenyl radical which is substituted by sulfo and R is a radical of the formula (20a), (20c) or (20d), the compounds of the formula (16) do contain two radicals R which are different from one another, and the proviso that the compounds of the formula (17) do not contain two identical radicals $W_3$ and $W_5$ of the formula (19) if R is a radical of the formula (20a), (20c) or (20d) and $Y_3$ is chlorine and n is the number 0 and $L_1$ is a substituted or unsubstituted phenylene or a substituted or unsubstituted stilbene bridge member.

The novel compounds of the formulae (16) and (17) are as preferred above.

The present invention furthermore relates to processes for the preparation of the novel compounds of the formulae (16) and (17).

The process for the preparation of the novel compounds of the formula (16) comprises reacting cyanuric halide, in particular cyanuric fluoride or, preferably, cyanuric chloride, with a compound of the formula $$W_1\text{-H} \qquad (26),$$

a compound of the formula $$W_2\text{-H} \qquad (27)$$

and, if appropriate, a compound of the formula $$Y_2\text{-H} \qquad (28)$$

in which $W_1$ and $W_2$ are as defined under formula (16) and $Y_2$ is amino, N-mono- or N,N-di-$C_1$–$C_4$alkylamino which is unsubstituted or substituted in the alkyl moiety, $C_5$–$C_7$-cycloalkylamino which is unsubstituted or substituted in the cycloalkyl ring, phenylamino or N-$C_1$–$C_4$alkyl-N-phenylamino which are unsubstituted or substituted in the phenyl ring, or N-heterocyclic radicals which may contain further hetero atoms.

Preferably, the cyanuric halide is first reacted with approximately stoichiometric amounts of a compound of the formula (26) at a temperature of –5° to 20° C., preferably 0° to 5° C., the pH being kept neutral to acid, preferably at 2 to 7, in particular 2 to 4, by addition of suitable bases, for example alkali metal bases, such as lithium hydroxide or carbonate, sodium hydroxide or carbonate or potassium hydroxide or carbonate. Approximately stoichiometric amounts of a compound of the formula (27) are advantageously added to the resulting reaction mixture, and this compound is reacted with the triazine derivative at slightly elevated temperature, preferably at 10° to 60° C., in particular 15° to 30° C., and at a neutral to slightly acid pH, which is preferably 6 to 7. If the compounds of the formulae (26) and (27) are identical compounds, about 2 molar equivalents of the compound of the formula (26) are advantageously employed, and this compound is reacted with about 1 molar equivalent of cyanuric halide.

The triazinyl compounds obtainable according to the process described above still contain a halogen atom which, if desired, can be converted into an amino group, into an N-mono- or N,N-di-$C_1$–$C_4$alkylamino group which is unsubstituted or substituted in the alkyl moiety, into a $C_5$-$C_7$cycloalkylamino group which is unsubstituted or substituted in the cycloalkyl ring, into a phenylamino or $N$-$C_1$-$C_4$alkyl-$N$-phenylamino group, which are unsubstituted or substituted in the phenyl ring, or into an $N$-heterocyclic group $Y_2$, which may contain further hetero atoms, by reaction with a compound of the formula (28) at elevated temperature, preferably 20° to 70° C., and at a neutral to slightly alkaline pH, which is, for example, 7 to 9, depending on the compound of the formula (28) employed.

The process for the preparation of the novel compounds of the formula (17) in which n is the number 0 comprises reacting a compound of the formula

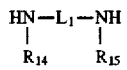  (29)

in any sequence with a compound of the formula

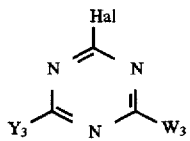  (30)

and a compound of the formula

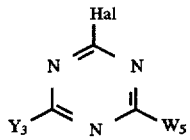  (31)

in which $R_{14}$, $R_5$, $L_1$, $Y_3$, $W_3$ and $W_5$ are as defined under formula (17) and Hal is halogen, in particular fluorine or, preferably, chlorine.

The reaction of the compound of the formula (29) with the compounds of the formulae (30) and (31) is carried out, for example, at slightly elevated temperature, preferably 10° to 60° C., in particular 15° to 50° C., and at a neutral to slightly acid pH, which is preferably 5 to 7. If the compounds of the formulae (30) and (31) are identical compounds, about 2 molar equivalents of the compound of the formula (30) are advantageously employed and this compound is reacted with about 1 molar equivalent of the compound of the formula (29).

Another embodiment for the preparation of the novel compounds of the formula (17) in which n is the number 0 comprises first subjecting a compound of the formula (29) to a condensation reaction with cyanuric halide, in particular cyanuric fluoride or, preferably, cyanuric chloride, and then reacting the resulting product in any sequence with a compound of the formula H-$W_3$ and a compound of the formula H-$W_5$.

The reaction of the cyanuric halide with the compound of the formula (29) is carried out, for example, as described above for the reaction of cyanuric halide with the compound of the formula (26). The reaction of the reaction product thus obtained with a compound of the formula H-$W_3$ and a compound of the formula H-$W_5$ can be carried out as described above for the reaction of the compound of the formula (29) with the compounds of the formulae (30) and (31).

The process for the preparation of the novel compounds of the formula (17) in which n is the number 1 comprises reacting a compound of the formula

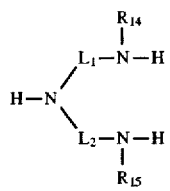  (32)

in any desired sequence with the compounds of the formulae (30) and (31) and then reacting the resulting reaction product with a compound of the formula

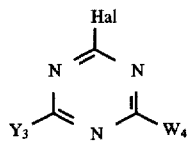  (33)

in which $R_{14}$, $R_{15}$, $L_1$, $L_2$, $Y_3$, $W3$, $W_4$ and $W_5$ are as defined under formula (17) and Hal is halogen, in particular fluorine or, preferably, chlorine.

The reaction of the compound of the formula (32) with the compounds of the formulae (30) and (31) can be carried out as described above for the reaction of the compound of the formula (29) with the compounds of the formulae (30) and (31). The subsequent reaction of the reaction product with the compound of the formula (33) can be carried out analogously.

The compounds employed in the above processes are known or can be obtained analogously to known compounds.

The compounds of the formulae (16) and (17) are present either in the form of their free acid or, preferably, as salts thereof.

Salts are, for example, the alkali metal, alkaline earth metal or ammonium salts or the salts of an organic amine. Examples are the sodium, lithium, potassium or ammonium salts or the salt of mono-, di- or triethanolamine.

No special devices are necessary for the dyeing process according to the invention. The customary dyeing apparatuses and machines can be used.

The liquor ratio can be chosen within a wide range, for example from 1:5 to 1:60, in particular from 1:5 to 1:30.

Dyeing is carried out, for example, at a temperature of 80° to 110° C., in particular a temperature of 95° to 105° C. Dyeing is preferably carried out at a pH of 3 to 6, in particular a pH of 3 to 5.5, and preferably a pH of 4 to 5.

Dyeing by the exhaust method is preferred.

Fixing with the fixing agent can be carried out both during the dyeing process and subsequently.

The fixing agent is preferably used in an amount of 0.1 to 10% by weight, in particular 0.5 to 5% by weight and preferably 0.5 to 3% by weight, based on the weight of the fibre material to be dyed.

Fixing with the fixing agent is preferably carried out in one step, in which the pH is brought to a value greater than or equal to 6, preferably 6 to 12, and in particular 6 to 10. The pH is preferably brought here to a value greater than or equal to 7, preferably 7 to 12, and in particular 7 to 10.

Thus, for example, fixing can be carried out in a separate bath after the dyeing, dyeing being carried out without the presence of the fixing agent. It has also proved advantageous to increase the pH, as described above, in this fixing step.

According to a preferred embodiment, dyeing is carried out in the presence of the fixing agent, which, for example, is added to the dyebath during the dyeing process or even already at the start of the dyeing process. In this case, the pH is preferably increased, as described above for the fixing step, during the dyeing process or after this.

The process according to the invention is suitable, by methods known per se, for dyeing natural or synthetic polyamide fibre materials, for example fibre materials of silk and, in particular, wool and synthetic polyamides. Dyeing of natural polyamide fibre materials, in particular of wool, is preferred. The textile material defined above can be in the most diverse forms of processing, for example as fibre, yarn, woven fabric or knitted fabric.

an aqueous sodium chloride solution are added to the dark red reaction solution and the product which has precipitated out is filtered off, washed with 10% aqueous sodium chloride solution and dried in vacuo at a temperature of 70° C. 52.5 parts of an intermediate compound of the formula

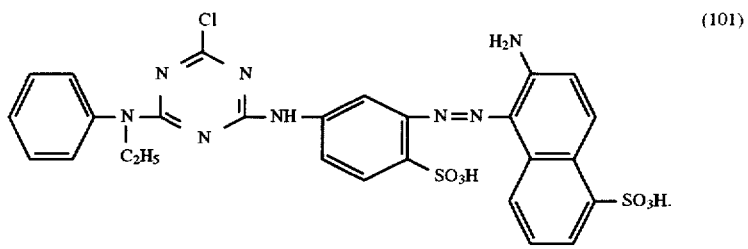

(101)

Level dyeings with good allround properties, in particular good fastness to rubbing, wet processing, wet rubbing and light, are obtained. The wet fastness properties of the dyeings, which are improved by the treatment with the fixing agent, the dyeings simultaneously having a very good levelness, are to be emphasized The following examples serve to illustrate the invention. The temperatures are stated in degrees Celsius, parts are parts by weight and the percentage data are based on percentages by weight, unless noted otherwise. Parts by weight bear the same relation to parts by volume as the kilogramme to the litre.

Preparation example 1

19.1 parts of 1,3-phenylenediamine-4-sulfonic acid (98.6%) are dissolved in 100 parts of water and 52 parts of an aqueous, 2 normal sodium hydroxide solution at a pH of 7, and the mixture is added dropwise to a mixture comprising 18.5 parts of cyanuric chloride, 100 parts of ice and 50 parts of water at a temperature of 5° C. in the course of 50 minutes. During the dropwise addition, the pH is kept at a value of 3 to 3.5. The pH is then increased to 7 in the course of 70 minutes with 50 parts of an aqueous 2 normal sodium hydroxide solution. After one hour, 25 parts of hydrochloric acid (37%) and 200 parts of water are added, and 25 parts of an aqueous 4 molar sodium nitrite solution are metered in at a temperature of 5 to 15° C. in the course of 25 minutes. After two hours, the excess sodium nitrite is destroyed with sulfamic acid. During this procedure, 22.5 parts of 2-naphthylamine-5-sulfonic acid are dissolved in 100 parts of water and 52 parts of an aqueous 2 normal sodium hydroxide solution at a pH of 7 and the solution is added dropwise to the reaction mixture in the course of 30 minutes. Thereafter, the pH is brought to a value of 7 in the course of 80 minutes by means of 112 parts of an aqueous 2 normal sodium hydroxide solution. A solution of 12.2 parts of N-ethylaniline in 100 parts of 1 molar hydrochloric acid is then added dropwise in the course of 15 minutes, followed by the addition of 101 parts of an aqueous 2 normal sodium hydroxide solution in the course of 50 minutes. 500 parts of are obtained.

10 parts of the intermediate product of the formula (101) are dissolved in 200 parts of water and the solution is added dropwise to a solution of 14 parts of 3-methylaminopropylamine in 14 parts of water at a temperature of 40° C. in the course of 4 hours. The mixture is subsequently stirred at a temperature of 40° C. for one hour and 25 parts of hydrochloric acid are then added. The product which has precipitated out is filtered off and washed with water. The moist material on the suction filter is introduced into 300 parts of water at a temperature of 70° C. and neutralized with 10 parts of an aqueous 1 normal sodium hydroxide solution. The product is salted out with 30 parts of sodium chloride, filtered off at a temperature of 40° C. and dried in vacuo at a temperature of 50° C. 8.8 parts of a dye which, in the form of the free acid, is the compound of the formula

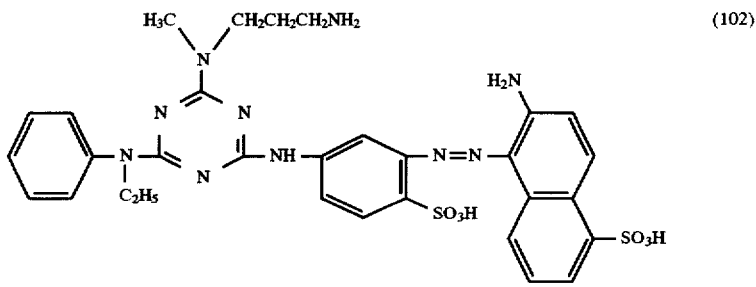

(102)

are obtained. The resulting dye of the formula (102) dyes wool and synthetic polyamide fibre material in orange colour shades.

Preparation examples 2 to 25

The dyes shown in the form of the free acids in the following Table 1, which dye wool and synthetic polyamide fibre material in the colour shades shown in column 3, can be obtained in a manner analogous to the instructions in preparation example 1.

TABLE 1
| Preparation-example | Dye | Colour shade on wool and polyamide |
|---|---|---|
| 2 | 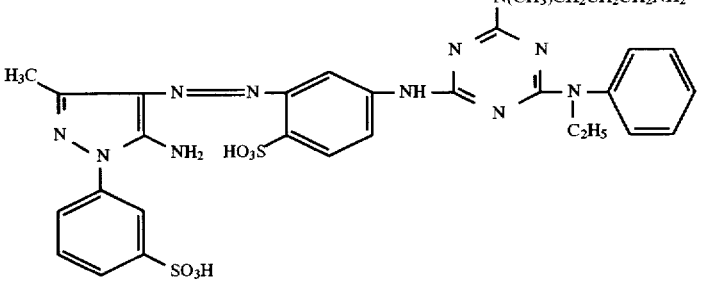 (103) | yellow |
| 3 | 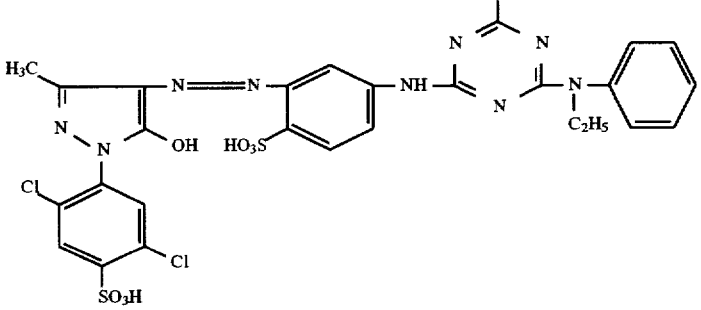 (104) | yellow |
| 4 | 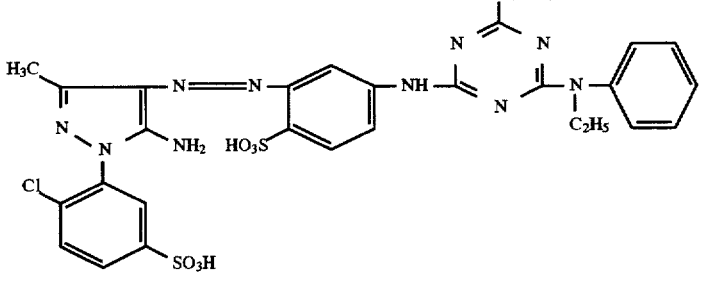 (105) | yellow |
| 5 | 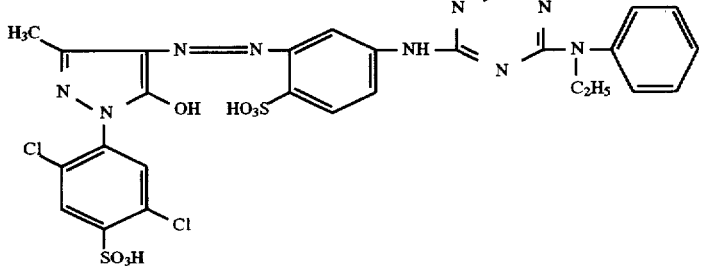 (106) | yellow |
| 6 | 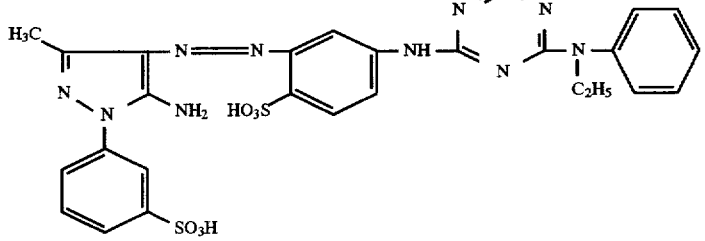 (107) | yellow |

TABLE 1-continued
| Preparation-example | Dye | Colour shade on wool and polyamide |
|---|---|---|
| 7 | 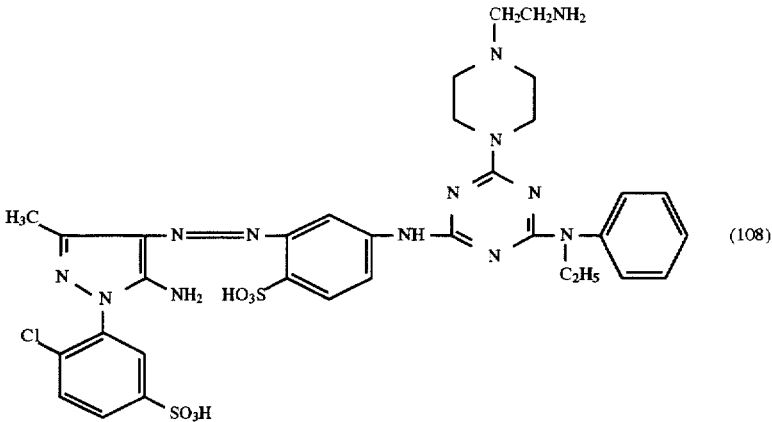 (108) | yellow |
| 8 | 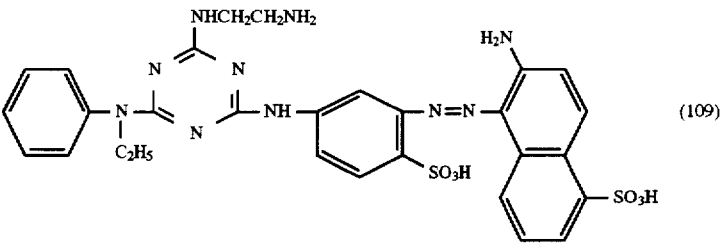 (109) | orange |
| 9 | 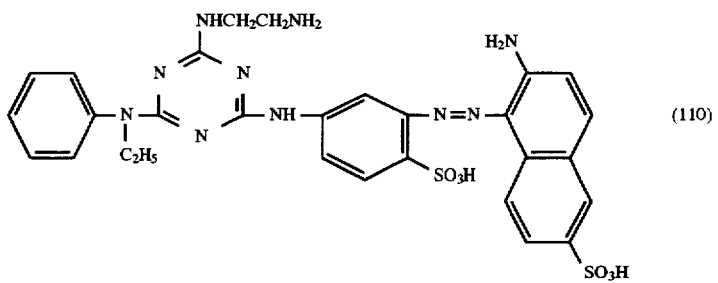 (110) | orange |
| 10 | 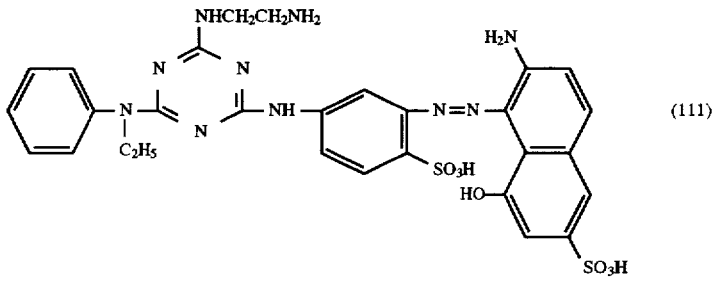 (111) | red |

TABLE 1-continued
| Preparation-example | Dye | Colour shade on wool and polyamide |
|---|---|---|
| 11 | 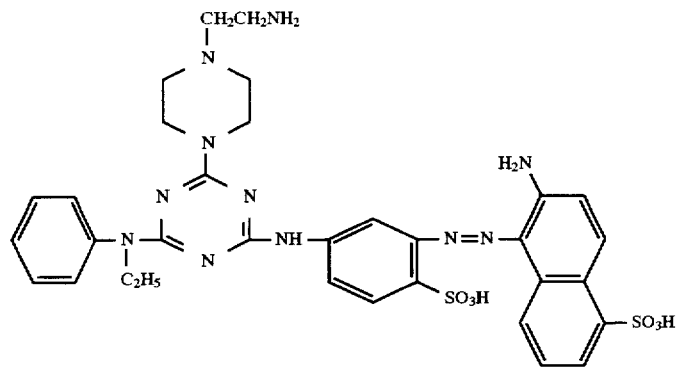 (112) | orange |
| 12 | 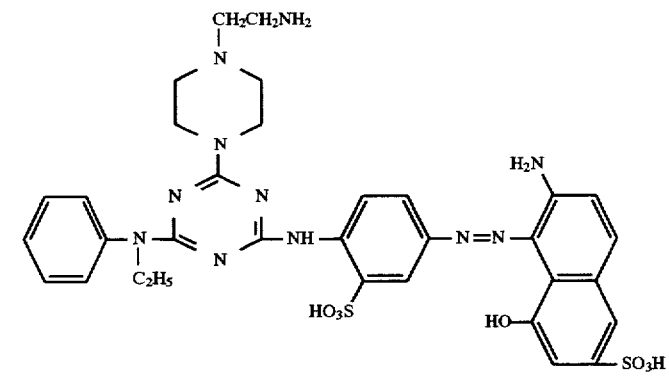 (113) | red |
| 13 | 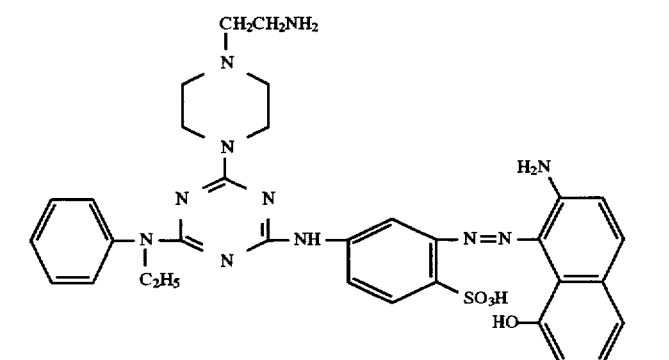 (114) | red |

TABLE 1-continued
| Preparation-example | Dye | Colour shade on wool and polyamide |
|---|---|---|
| 14 | 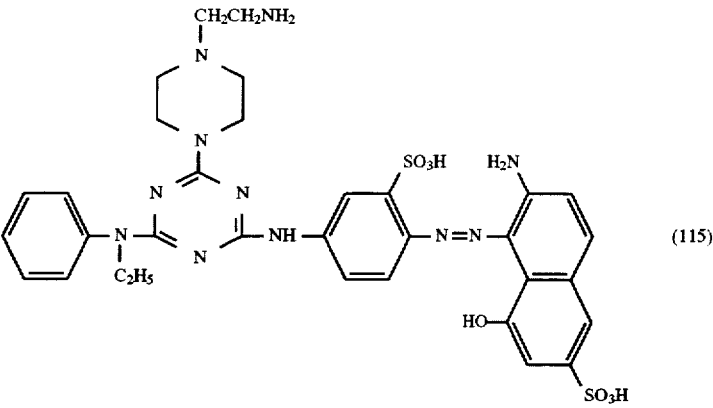 (115) | red |
| 15 | (116) | red |
| 16 | (117) | red |
| 17 | (118) | red |

TABLE 1-continued
| Preparation-example | Dye | Colour shade on wool and polyamide |
|---|---|---|
| 18 | 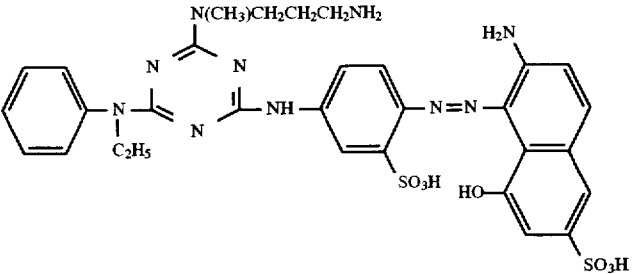 (119) | red |
| 19 | 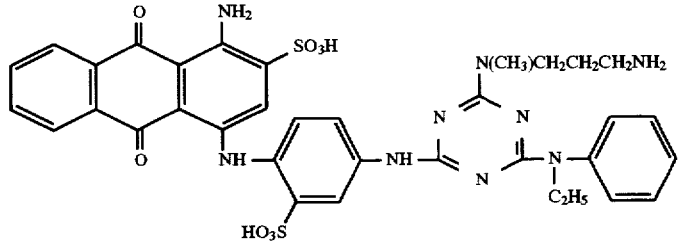 (120) | blue |
| 20 | 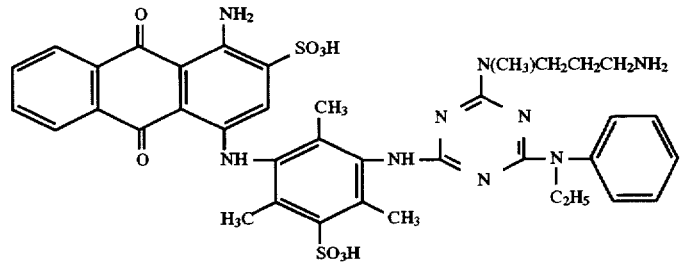 (121) | blue |
| 21 | 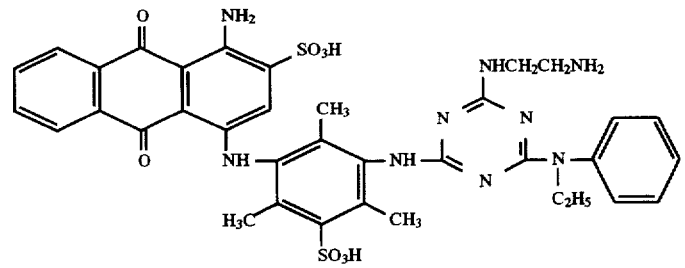 (122) | blue |

TABLE 1-continued
| Preparation-example | Dye | Colour shade on wool and polyamide |
|---|---|---|
| 22 | 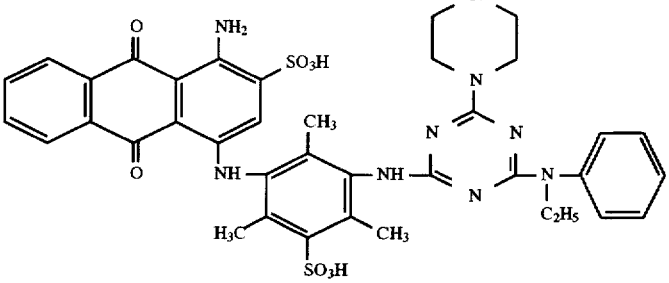 (123) | blue |
| 23 | 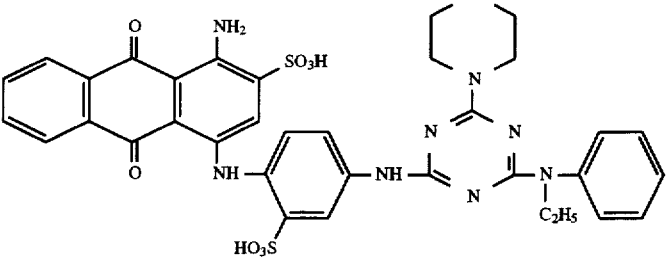 (124) | blue |
| 24 | 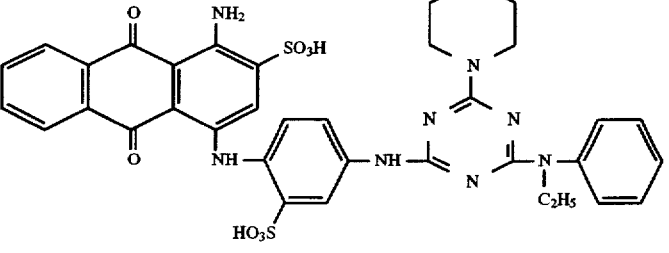 (125) | blue |
| 25 | 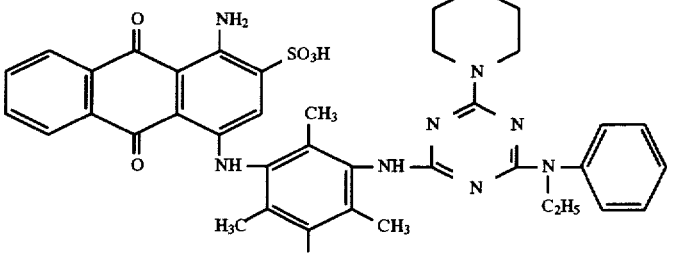 (126) | blue |

Example 1

18.2 parts of 4,4'-diaminobiphenyl-2,2'-disulfonic acid are suspended in 100 parts of water and dissolved with 52 parts of an aqueous sodium carbonate solution (10%) at a pH of 6.5 to 7. This solution is added dropwise to a mixture comprising 18.4 parts of cyanuric chloride, 240 parts of acetone and 120 parts of ice at a temperature of 0° C. in the course of 45 minutes. The pH here is kept at 2.5 with 48.5 parts of an aqueous sodium carbonate solution (10%). 51.8 parts of a 48% aqueous solution of 2-(2-aminoethoxy)-2'-chloro-diethyl sulfone hydrochloride are then added dropwise at a temperature of 5° to 15° C. At the same time, the pH is kept at a value of 4 with a 10% aqueous sodium carbonate solution. Thereafter, the pH is slowly increased to a value of 7 with 80 parts of a 10% aqueous sodium carbonate solution. After a subsequent stirring time of one hour at room temperature, 25 parts of hydrochloric acid (37%) are added dropwise. The solvent is decanted off from the product which has precipitated out. The product is stirred briefly in 200 parts of methanol, filtered off and dried in vacuo. 33.7 parts of a compound which, in the form of the free acid, has the formula

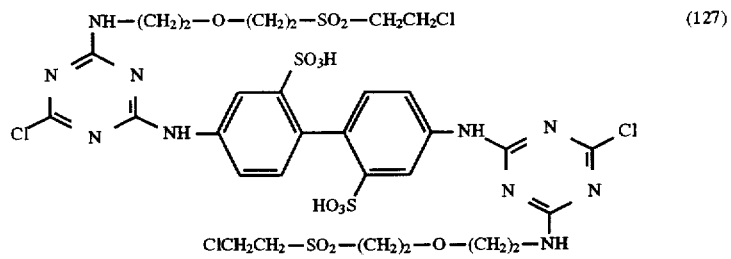

(127)

are obtained.

Example 2

14.5 parts of 2-aminophenylsulfonyl-ethyl hydrogen sulfate are suspended in 50 parts of water and dissolved with 31 parts of an aqueous 1 molar sodium carbonate solution at a pH of 6.5. This solution is added dropwise to a mixture comprising 9.1 parts of cyanuric chloride, 100 parts of acetone and 50 parts of ice at a temperature of 0° to −5° C. in the course of one hour. The pH here is kept at 2.5 with 24 parts of an aqueous 1 molar sodium carbonate solution. After a subsequent stirring time of 2 hours, a solution of 8.6 parts of 4,4'-diaminobiphenyl-2,2'-disulfonic acid in 50 parts of water and 22 parts of an aqueous 2 normal sodium hydroxide solution is added dropwise at a pH of 4 in the course of 30 minutes. The mixture is then stirred at a temperature of 35° to 40° C. and a pH of 5.5 for 18 hours. 150 parts of an aqueous sodium chloride solution are added to the reaction solution. The product which has precipitated out is filtered off and dried in vacuo. 25 parts of a compound which, in the form of the free acid, has the formula

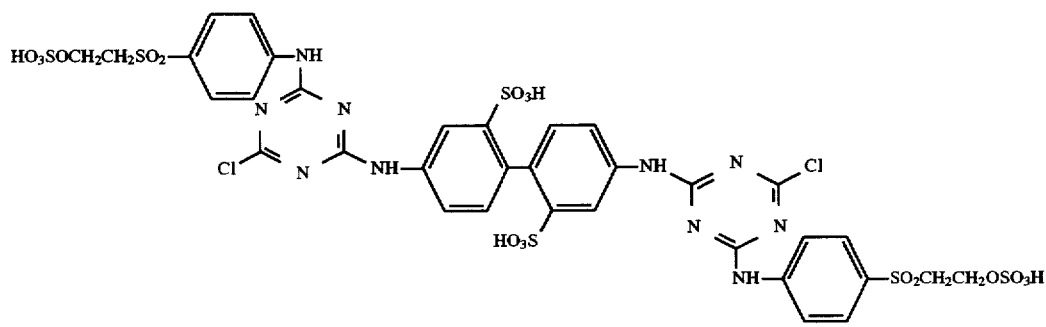

(128)

are obtained.

Examples 3 to 20

The compounds shown in the form of the free acids in the following Table 2 can be obtained in a manner analogous to the instructions in Example 1 or 2.

TABLE 2

| Example | Compound | |
|---|---|---|
| 3 | (chemical structure with HO₃SOCH₂CH₂SO₂–C₆H₄–NH–triazine(Cl)–NH–C₆H₄–SO₂CH₂CH₂OSO₃H) | (129) |
| 4 | (chemical structure with HO₃SOCH₂CH₂SO₂–C₆H₄–NH–triazine(Cl)–NH–C₆H₃(SO₃H)–NHCOCHBrCH₂Br) | (130) |
| 5 | (chemical structure with HO₃SOCH₂CH₂SO₂–C₆H₄–NH–triazine(Cl)–NH–(CH₂)₂–O–(CH₂)₂–SO₂–CH₂CH₂Cl) | (131) |
| 6 | (chemical structure with ClCH₂CH₂–SO₂–(CH₂)₂–O–(CH₂)₂–NH–triazine(Cl)–NH–C₆H₃(SO₃H)–NH–CO–CHBrCH₂Br) | (132) |
| 7 | (chemical structure with HO₃SOCH₂CH₂SO₂–C₆H₄–NH–triazine(Cl)–NH–C₆H₃(SO₃H)–NH–CO–C₆H₄–NH–triazine(Cl)–NH–C₆H₄–SO₂CH₂CH₂OSO₃H) | (133) |

TABLE 2-continued

| Example | Compound |
|---|---|
| 8 | (134) chemical structure |
| 9 | (135) chemical structure |
| 10 | (136) chemical structure |

TABLE 2-continued

| Example | Compound |
|---------|----------|
| 11 | Structure (137): 4-(HO₃SOCH₂CH₂SO₂)-phenyl–NH–[chloro-triazine]–NH–3-(CO–NH–(CH₂)₂–SO₂CH₂CH₂OSO₃H)-phenyl |
| 12 | Structure (138): 2-OCH₃-5-CH₃-4-(HO₃SOCH₂CH₂SO₂)-phenyl–NH–[chloro-triazine]–NH–2-H₃CO-5-CH₃-4-(SO₂CH₂CH₂OSO₃H)-phenyl |
| 13 | Structure (139): 4-(HO₃SOCH₂CH₂SO₂)-phenyl–NH–[chloro-triazine]–NH–[2-SO₃H-4-(NH–[chloro-triazine]–NH–3-(CO–NH–(CH₂)₂–SO₂CH₂CH₂OSO₃H)-phenyl)]-phenyl |

TABLE 2-continued
| Example | Compound |
|---|---|
| 14 | 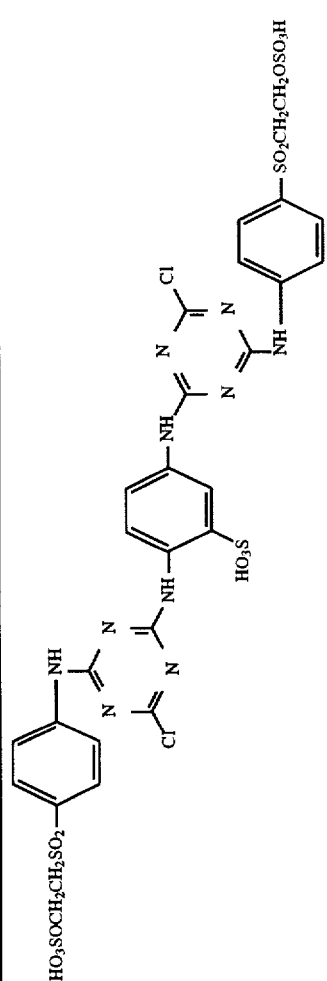 (140) |
| 15 | 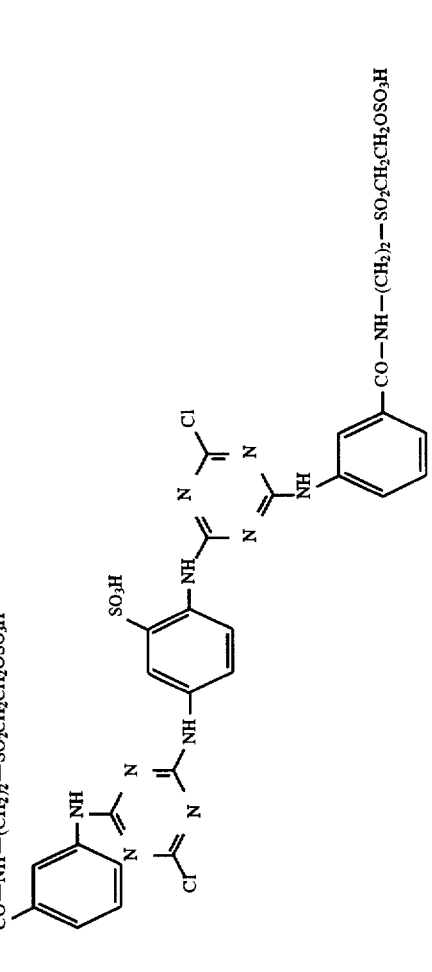 (141) |

TABLE 2-continued

| Example | Compound |
|---|---|
| 16 | (142) structure with CO—NH—(CH$_2$)$_2$—SO$_2$CH$_2$CH$_2$OSO$_3$H groups linked via triazine-phenyl system |
| 17 | (143) structure with SO$_2$CH$_2$CH$_2$OSO$_3$H and CO—NH—(CH$_2$)$_2$—SO$_2$CH$_2$CH$_2$OSO$_3$H groups linked via triazine-phenyl system |

TABLE 2-continued

| Example | Compound |
|---|---|
| 18 | (144) chemical structure |
| 19 | (145) chemical structure |

TABLE 2-continued

| Example | Compound |
|---|---|
| 20 | (chemical structure) (146) |

Dyeing Example 1

100 parts of a woollen fabric are pretreated for 5 minutes at a temperature of 30° C. and a pH of 4.5 in an aqueous bath which comprises 2000 parts of water, 5 parts of sodium sulfate, 2 parts of sodium acetate and 2 parts of 80% acetic acid. After addition of an aqueous solution comprising 0.9 part of the dye of the formula (102), the dye liquor is kept at a temperature of 30° C. for a further 5 minutes and then heated to a temperature of 100° C. at a heating-up rate of 1.5° C. per minute. Dyeing is carried out at this temperature for 60 minutes, the bath is then cooled to 50° C. and the dye liquor is drained off. The woolen fabric, which has been dyed in an orange colour shade, is rinsed and pretreated for 5 minutes at a temperature of 30° C. and a pH of 7 in a fresh aqueous bath which comprises 2000 parts of water, 5 parts of sodium sulfate, 11.6 parts of disodium hydrogen phosphate and 7.6 parts of potassium hydrogen phosphate. After addition of an aqueous solution comprising 2 parts of the fixing agent of the formula (129), the dye liquor is kept at a temperature of 30° C. for a further 5 minutes and then heated to 100° C. at a heating-up rate of 1.5° C. per minute. This temperature is maintained for 60 minutes. The bath is then cooled to a temperature of 50° C. and the dye liquor is drained off. The woolen fabric is rinsed and dried. The resulting dyeing is level and has very good wet fastness properties.

Dyeing Example 2

100 parts of a woolen fabric are pretreated for 5 minutes at a temperature of 30° C. and a pH of 4.5 in an aqueous bath which comprises 2000 parts of water, 5 parts of sodium sulfate, 2 parts of sodium acetate and 2 parts of 80% acetic acid. After addition of an aqueous solution comprising 0.9 part of the dye of the formula (102) and 2 parts of the fixing agent of the formula (129), the dye liquor is kept at a temperature of 30° C. for a further 5 minutes and then heated to a temperature of 100° C. at a heating-up rate of 1.5° C. per minute. Dyeing is carried out at this temperature for 40 minutes, 15 parts of disodium hydrogen phosphate are added and dyeing is continued at a pH of 7 for a further 40 minutes. The bath is then cooled to 50° C. and the dye liquor is drained off. The woolen fabric, which has been dyed in an orange colour shade, is rinsed and dried. The resulting dyeing is level and has very good wet fastness properties.

Dyeing Example 3

100 parts of a woolen fabric are pretreated for 5 minutes at a temperature of 30° C. and a pH of 4.5 in an aqueous bath which comprises 2000 parts of water, 5 parts of sodium sulfate, 2 parts of sodium acetate and 2 parts of 80% acetic acid. After addition of an aqueous solution comprising 0.9 part of the dye of the formula (102), the dye liquor is kept at a temperature of 30° C. for a further 5 minutes and then heated to a temperature of 100C., at a heating-up rate of 1.5° C. per minute. Dyeing is carried out at this temperature for 40 minutes, 15 parts of disodium hydrogen phosphate and 2 parts of the fixing agent of the formula (129) are added and dyeing is continued at a pH of 7 for a further 40 minutes. The bath is then cooled to 50° C. and the dye liquor is drained off. The woolen fabric, which has been dyed in an orange colour shade, is rinsed and dried. The resulting dyeing is level and has very good wet fastness properties.

Dyeing Examples 4 to 27

The procedure described in Dyeing Example 3 is repeated, using an equimolar amount of a dye according to Preparation Examples 2 to 25 instead of 0.9 part of the dye of the formula (102). A woolen fabric which has been dyed levelly and has good wet fastness properties is likewise obtained.

Instead of the process according to Dyeing Example 3, the procedure according to Dyeing Example 1 or 2 can also be followed.

Dyeing Examples 28 to 46

The procedure described in Dyeing Example 3 is repeated, except that an equimolar amount of one of the fixing agents according to Examples 1, 2 and 4 to 20 are used instead of 2 parts of the fixing agent of the formula (129). A woolen fabric which has been dyed levelly and has good wet fastness properties is likewise obtained.

Instead of the process according to Dyeing Example 3, the procedure according to Dyeing Example 1 or 2 can also be followed.

What is claimed is:

1. A process for dyeing a natural or synthetic polyamide fibre material, which comprises applying to said fibre material at least one anionic acid dye of the formula

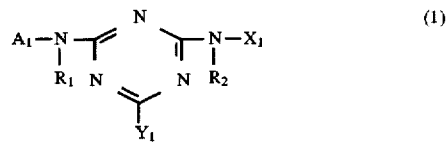

and treating the fibre material mentioned, during or after the dyeing process, with a colourless fixing agent which contains sulfo or sulfato groups and contains at least two fibre-reactive groups, where $R_1$ and $R_2$ independently of one another are hydrogen or substituted or unsubstituted $C_1$–$C_4$alkyl, $X_1$ is substituted or unsubstituted $C_1$–$C_8$alkyl, $C_5$–$C_7$cycloalkyl, phenyl or naphthyl, or the radical of the formula —N($R_2$)-$X_1$ is a ring, which may contain further heteroatoms, $Y_1$ is a radical of the formula

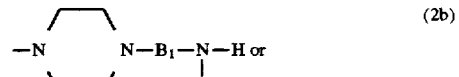

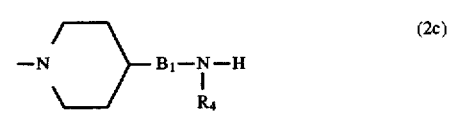

in which $B_1$ is a colourless organic bridge member, $R_3$ is hydrogen or substituted or unsubstituted $C_1$–$C_4$alkyl and $R_4$ is hydrogen or substituted or unsubstituted $C_1$–$C_8$alkyl, $C_5$–$C_7$cycloalkyl, phenyl or naphthyl, and $A_1$ is the radical of a monoazo dye of the formula

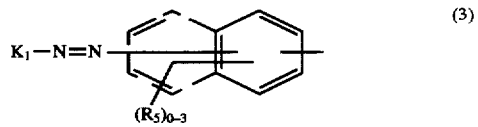

in which the dashed lines represent an optional naphthalene ring, $K_1$ is a radical of the benzene or naphthalene series or a heterocyclic radical and $(R_5)_{0-3}$ is 0 to 3 identical or different substituents chosen from the group consisting of $C_1$–$C_4$alkyl, $C_1$–$C_4$alkoxy, $C_2$–$C_4$alkanoylamino, ureido, halogen, carboxyl and sulfo, or

49

$A_1$ is the radical of a polyazo, metal complex azo, anthraquinone, formazan, phthalocyanine or dioxazine dye.

2. A process according to claim 1, wherein $R_1$ and $R_2$ independently of one another are hydrogen or $C_1$–$C_4$alkyl.

3. A process according to claim 1, wherein $X_1$ is $C_1$–$C_8$alkyl, $C_5$–$C_7$cycloalkyl which is unsubstituted or substituted by $C_1$–$C_4$alkyl, or phenyl or naphthyl which are unsubstituted or substituted by $C_1$–$C_4$alkyl, $C_1$–$C_4$alkoxy, $C_2$–$C_4$-alkanoylamino, ureido, halogen, carboxyl or sulfo.

4. A process according to claim 1, wherein $X_1$ is phenyl which is unsubstituted or substituted by $C_1$–$C_4$alkyl, $C_1$–$C_4$alkoxy, $C_2$–$C_4$-alkanoylamino, ureido, halogen, carboxyl or sulfo.

5. A process according to claim 1, wherein $B_1$ is a $C_1$–$C_{10}$alkylene radical which may be interrupted by 1, 2 or 3 members from the group consisting of —NH—, —N(CH$_3$)— or —O— and is unsubstituted or substituted by hydroxyl, sulfo, sulfato, cyano or carboxyl.

6. A process according to claim 1, wherein $R_3$ is hydrogen or $C_1$–$C_4$alkyl.

7. A process according to claim 1, wherein $R_4$ is hydrogen or $C_1$–$C_8$alkyl which is unsubstituted or substituted by hydroxyl, sulfo, sulfato, cyano or carboxyl.

8. A process according to claim 1, wherein $R_4$ is hydrogen or $C_1$–$C_4$alkyl.

9. A process according to claim 1, wherein $R_3$ and $R_4$ independently of one another are hydrogen or $C_1$–$C_4$alkyl and $B_1$ is a $C_1$–$C_{10}$alkylene radical.

10. A process according to claim 1, wherein $R_2$ is $C_1$–$C_4$alkyl.

11. A process according to claim 1, wherein $A_1$ is a radical of the formula (3) or the radical of a disazo or anthraquinone dye.

12. A process according to claim 1, wherein $A_1$ is a radical of the formula (3)

or a radical of the formula $$\left[ K_2-N=N-\underset{(R_{11})_{0-3}}{\underset{|}{\bigcirc}}-N=N-\underset{(R_{12})_{0-3}}{\underset{|}{\bigcirc}} \right]- \quad (9)$$

in which the dashed lines represent an optional naphthalene ring $(R_{11})_{0-3}$ and $(R_{12})_{0-3}$ independently of one another are 0 to 3 identical or different subtituents chosen from the group consisting of $C_1$–$C_4$alkyl, $C_1$–$C_4$alkoxy, $C_2$–$C_4$alkanoylamino, halogen, hydroxyl, cyano, carbamoyl, carboxyl, sulfo, amino and N-mono- or N,N-di-$C_1$–$C_4$alkylamino, and $K_2$ is a radical of the benzene or naphthalene series or a heterocyclic radical, or is a radical of the formula

50

$$\text{(11)}$$

in which G is a phenylene radical which is unsubstituted or substituted by $C_1$–$C_4$alkyl, $C_1$–$C_4$alkoxy, halogen, carboxyl or sulfo, or a cyclohexylene, phenylenemethylene or $C_2$–$C_6$alkylene radical.

13. A process according to claim 1, wherein $A_1$ is a radical of the formula $$K_1-N=N-\underset{(R_5)_{0-3}}{\underset{|}{\bigcirc}}, \quad (4)$$

$$K_2-N=N-\underset{(R_{11})_{0-3}}{\underset{|}{\bigcirc}}-N=N-\underset{(R_{12})_{0-3}}{\underset{|}{\bigcirc}} \quad (10)$$

or $$\text{(12)}$$

in which the dashed lines in formula (10) represent an optional naphthalene ring $(R_5)_{0-3}$ is 0 to 3 identical or different substituents chosen from the group consisting of $C_1$–$C_4$alkyl, $C_1$–$C_4$alkoxy, halogen and sulfo, $(R_{11})_{0-3}$ and $(R_{12})_{0-3}$ independently of one another are 0 to 3 identical or different substituents chosen from the group consisting of $C_1$–$C_4$alkyl, $C_1$–$C_4$alkoxy, $C_2$–$C_4$alkanoylamino, halogen, hydroxyl, cyano, carbamoyl, carboxyl, sulfo, amino and N-mono- or N,N-di-$C_1$–$C_4$alkylamino, $(R_{13})_{0-3}$ is 0 to 3 identical or different substituents chosen from the group consisting of $C_1$–$C_4$alkyl, $C_1$–$C_4$alkoxy, halogen, carboxyl and sulfo, and $K_1$ and $K_2$ independently of one another are a radical of the formula $$\text{(5)}$$

in which $R_6$ is methyl or carboxyl, $R_7$ is amino or hydroxyl and $(R_8)_{0-3}$ is 0 to 3 identical or different substituents chosen from the group consisting of $C_1$–$C_4$alkyl, $C_1$–$C_4$alkoxy, $C_2$–$C_4$alkanoylamino, ureido, halogen, carboxyl and sulfo, or a radical of the formula

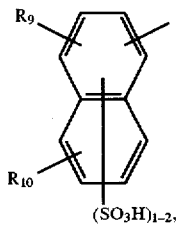
(6)

in which $R_9$ is hydrogen, amino or N-mono- or N,N-di-$C_1$–$C_4$alkylamino and $R_{10}$ is hydrogen or hydroxyl.

14. A process according to claim 1, wherein the fixing agent used is a compound of the formula

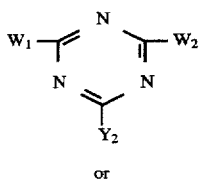
(16)

or

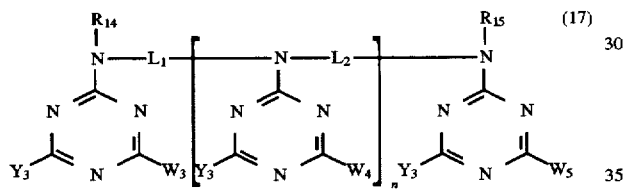
(17)

in which $R_{14}$ and $R_{15}$ independently of one another are hydrogen or substituted or unsubstituted $C_1$–$C_4$alkyl, $Y_2$ and $Y_3$ independently of one another are fluorine, chlorine, amino, N-mono- or N,N-di-$C_1$–$C_4$alkylamino which is unsubstituted or substituted in the alkyl moiety, $C_5$–$C_7$cycloalkylamino which is unsubstituted or substituted in the cycloalkyl ring, phenylamino or N-$C_1$–$C_4$alkyl-N-phenylamino which are unsubstituted or substituted in the phenyl ring, or N-heterocyclic radicals, which may contain further hetero atoms, $L_1$ and $L_2$ are a colourless, organic bridge member, n is the number 0 or 1, $W_1$, $W_2$, $W_3$, $W_4$ and $W_5$ independently of one another are a radical of the formula $$-NH-(CH_2)_{2-3}-O-(CH_2)_{2-3}-SO_2Z \qquad (18)$$

or

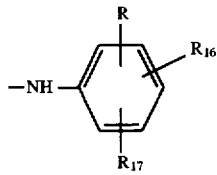
(19)

in which $R_{16}$ and $R_{17}$ independently of one another are hydrogen, $C_1$–$C_4$alkyl, $C_1$–$C_4$alkoxy, $C_2$–$C_4$alkanoylamino, ureido, halogen, carboxyl or sulfo, Z is a radical of the formula —$CH_2CH_2$–U or —CH=$CH_2$ and U is a leaving group, and R is a radical of the formula

| | |
|---|---|
| —$SO_2Z$ | (20a), |
| —CONH—$(CH_2)_{2-3}$—$SO_2Z$ | (20b), |
| —NH—CO—CH(Hal)—$CH_2$—Hal | (20c), |
| —NH—CO—C(Hal)=$CH_2$ | (20d), |
| —NH—CO—CH=$CH_2$ | (20e) or |
| —NH—CO—$CH_2Cl$ | (20f) | and Hal is halogen and Z is as defined above.

15. A process according to claim 1, wherein dyeing is carried out by the exhaust method.

16. A process according to claim 1, wherein wool or synthetic polyamide fibre material is dyed.

* * * * *